United States Patent [19]

Hatakeyama et al.

[11] Patent Number: 5,123,294
[45] Date of Patent: Jun. 23, 1992

[54] DETENT STRUCTURE FOR AN AUTOMATIC TRANSMISSION SYSTEM

[75] Inventors: Kazuma Hatakeyama; Yoshimichi Tsubata, both of Saitama, Japan

[73] Assignee: Honda Giken Kogyo Kabushiki Kaisha, Tokyo, Japan

[21] Appl. No.: 746,531

[22] Filed: Aug. 19, 1991

[30] Foreign Application Priority Data

Sep. 26, 1990 [JP] Japan .............................. 2-100482[U]

[51] Int. Cl.$^5$ .............................................. B60K 20/00
[52] U.S. Cl. ......................................... 74/475; 74/540; 251/297
[58] Field of Search ................... 74/475, 540; 251/297

[56] References Cited

U.S. PATENT DOCUMENTS 4,704,917 11/1987 Hiroyasu ................................ 74/475

FOREIGN PATENT DOCUMENTS 60-94858 5/1985 Japan .
1-87417 6/1989 Japan .

Primary Examiner—Dirk Wright
Attorney, Agent, or Firm—Armstrong, Nikaido, Marmelstein, Kubovcik & Murray

[57] ABSTRACT

A detent structure for a hydraulic automatic transmission system, in which a control shaft rotatably supported by a casing of the automatic transmission system carries a detent cam plate integrally attached thereto and radially extending therefrom. The free end of the detent cam plate is provided with a cam profile defining a plurality of depressions corresponding to different shift positions of the automatic transmission system in cooperation with a cam follower urged against the cam profile by a tension coil spring extending across the control shaft and a detent arm carrying the cam follower. Therefore, no extra radial load is applied to the opening of the transmission casing rotatably supporting the control shaft, and, therefore, the force required to rotate the control shaft is not affected by the force urging the cam follower against the cam profile of the detent cam plate securely attached to the control shaft.

5 Claims, 3 Drawing Sheets

DETENT STRUCTURE FOR AN AUTOMATIC TRANSMISSION SYSTEM

TECHNICAL FIELD

The present invention relates to a detent structure for a hydraulic automatic transmission system having a control shaft rotatably supported by the casing of the automatic transmission system in a broad sense such as the transmission case, the torque converter case or the valve body, and adapted to be actuated by a shift lever to operate a manual valve for the shift control of the automatic transmission system.

BACKGROUND OF THE INVENTION

Conventionally, various kinds of motor vehicles are equipped with automatic transmission systems which allow the operator of the vehicle to shift the transmission gears without operating the clutch, and such an automatic transmission system comprising a torque converter, a multi-disk clutch and a gear train is typically controlled by hydraulic pressure.

Such a transmission system is typically equipped with a manual valve for controlling hydraulic pressure for manual shifting, and a control shaft rotatably supported by the casing or other fixed part of the transmission system and rotated by the operation of the shift lever so as to operate the manual valve. Further, to the control shaft is integrally attached a detent cam plate having a cam surface including depressions corresponding to different shift positions of the shift lever on its free end, and the manual valve and the control shaft are accurately positioned according to each selected shift position by urging a cam follower member such as a roller against this cam surface with a spring member.

Japanese patent laid open publication No. 60-94858 discloses such a detent cam plate 24 integrally secured to a control shaft 22, and a sheet spring 25 urging a cam follower consisting of a roller 26 against a wavy cam surface 24a through 24 defined along an edge of the detent cam plate 24. Japanese utility model laid open publication No. 1-87417 discloses a similar structure which however employs a compression coil spring 15 to urge a cam follower against the cam profile of the detent cam plate 8.

However, according to such prior detent structures, the spring force urging the cam follower against the cam profile of the detent cam plate is transmitted to the control shaft, and this force is counter-acted by a radial force at an opening of the casing of the transmission system rotatably supporting the control shaft. Such a radial force at the load-bearing surface of the opening rotatably supporting the control shaft causes an increase in the resistance against the rotation of the control shaft, and, thereby, an increase in the force required to operate the shift level from the initially designed level.

Further, when the spring member for urging the cam follower against the cam profile of the detent cam plate consists of a sheet spring, it is difficult to achieve an optimum spring force since the adjustment of the spring force requires a change to be made to the dimensions of the sheet spring. A coil spring allows easy adjustment of the spring force, but using a compression coil spring involves some complication of the structure and difficulty of the assembly work.

BRIEF SUMMARY OF THE INVENTION

In view of such problems of the prior art, a primary object of the present invention is to provide a detent structure for an automatic transmission system which would not cause an increase in radial load on the load-bearing surface of the opening of the transmission casing or other fixed part of the transmission system rotatably supporting the control shaft carrying a detent cam plate for producing a force for elastically retaining the control shaft at each of the positions corresponding to different shift positions of the automatic transmission system or, in other words, would not increase the force required to operate the shift lever.

A second object of the present invention is to provide such a detent structure which simplifies the assembly work and the setting of the spring force.

These and other objects of the present invention can be accomplished by providing a detent structure for a hydraulic automatic transmission system, comprising: a control shaft rotatably supported by a fixed part of the automatic transmission system; linkage means for transmitting an operating movement of a shift lever to an angular movement of the control shaft; a detent cam plate integrally attached to and radially extending from the control shaft, a free end of the detent cam plate being provided with a cam profile defining a plurality of depressions corresponding to different shift positions of the automatic transmission system; a detent arm rotatably supported by a fixed part of the automatic transmission system and provided with a cam follower for engaging with the cam profile of the detent cam plate; and spring means such as a tension coil spring extending across the control shaft and the detent arm to urge the cam follower towards the cam profile.

Since the spring force is applied between the cam follower or the detent cam plate and the control shaft, no extra radial load is applied to the opening supporting the control shaft, and, therefore, the force required to rotate the control shaft is not affected by the force urging the cam follower against the cam profile of the detent cam plate securely attached to the control shaft. Further, the spring means may consist of a simple tension coil spring which can be freely and readily adjusted so as to produce an optimum spring force.

According to a preferred embodiment of the present invention, the detent arm is rotatably supported by a pin passed through the casing of the automatic transmission system and a valve body attached thereto, and this pin can serve as a locating pin for mounting the valve body on the automatic transmission system casing. Alternatively, depending on the particular structure of the automatic transmission system, this pin may be passed through two valve bodies securely attached to the automatic transmission system casing so as to serve as a locating pin between the two valve bodies.

Further, the pin rotatably supporting the detent arm may engage with a planar part of an otherwise cylindrical valve element slidably received in the valve body so that the rotation of the valve element may be prevented by conveniently using the pivot pin for the detent arm.

BRIEF DESCRIPTION OF THE DRAWINGS

Now the present invention is described in the following in terms of a preferred embodiment thereof with reference to the appended drawings, in which.

DETAILED DESCRIPTION OF THE PREFERRED EMBODIMENT

Figure 1:
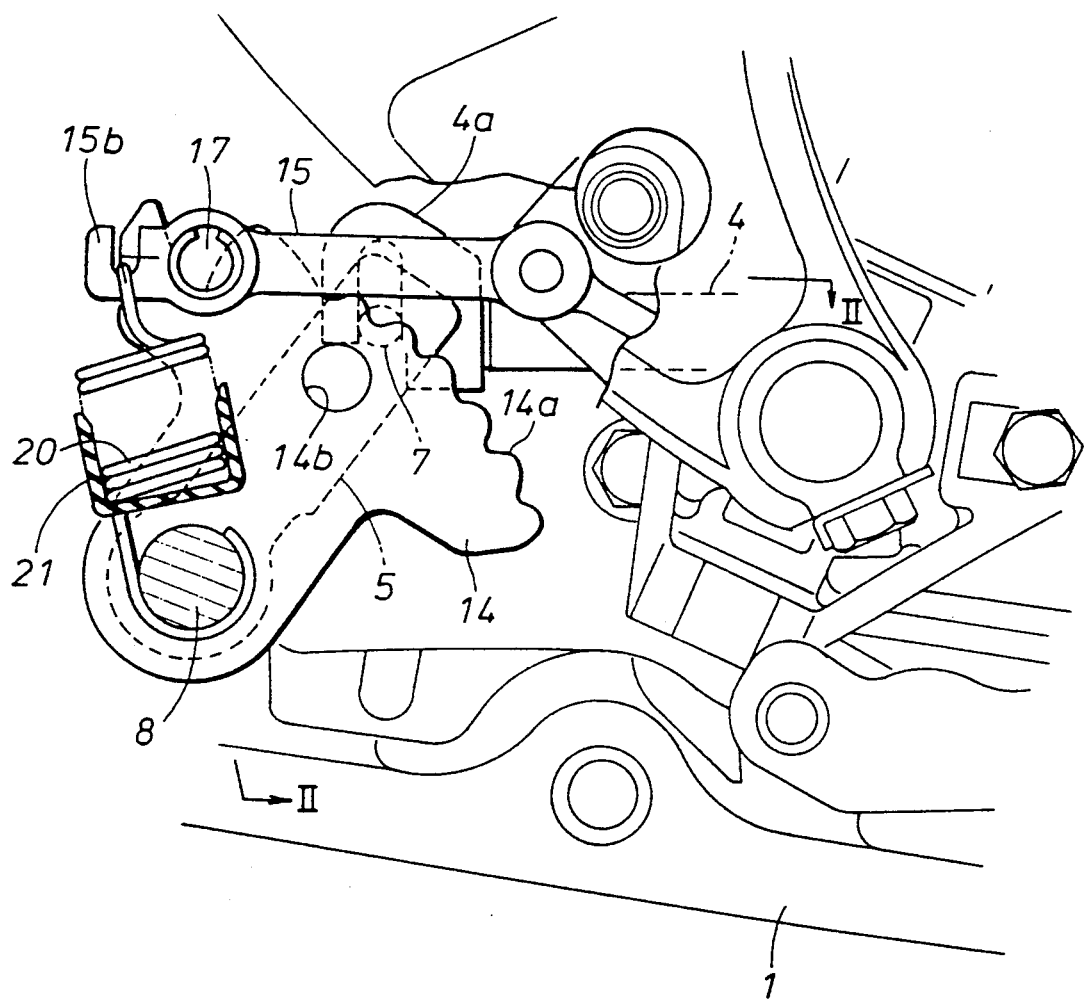
FIG. 1 is a fragmentary front view showing an automotive automatic transmission system to which the present invention is applied.
Figure 2:
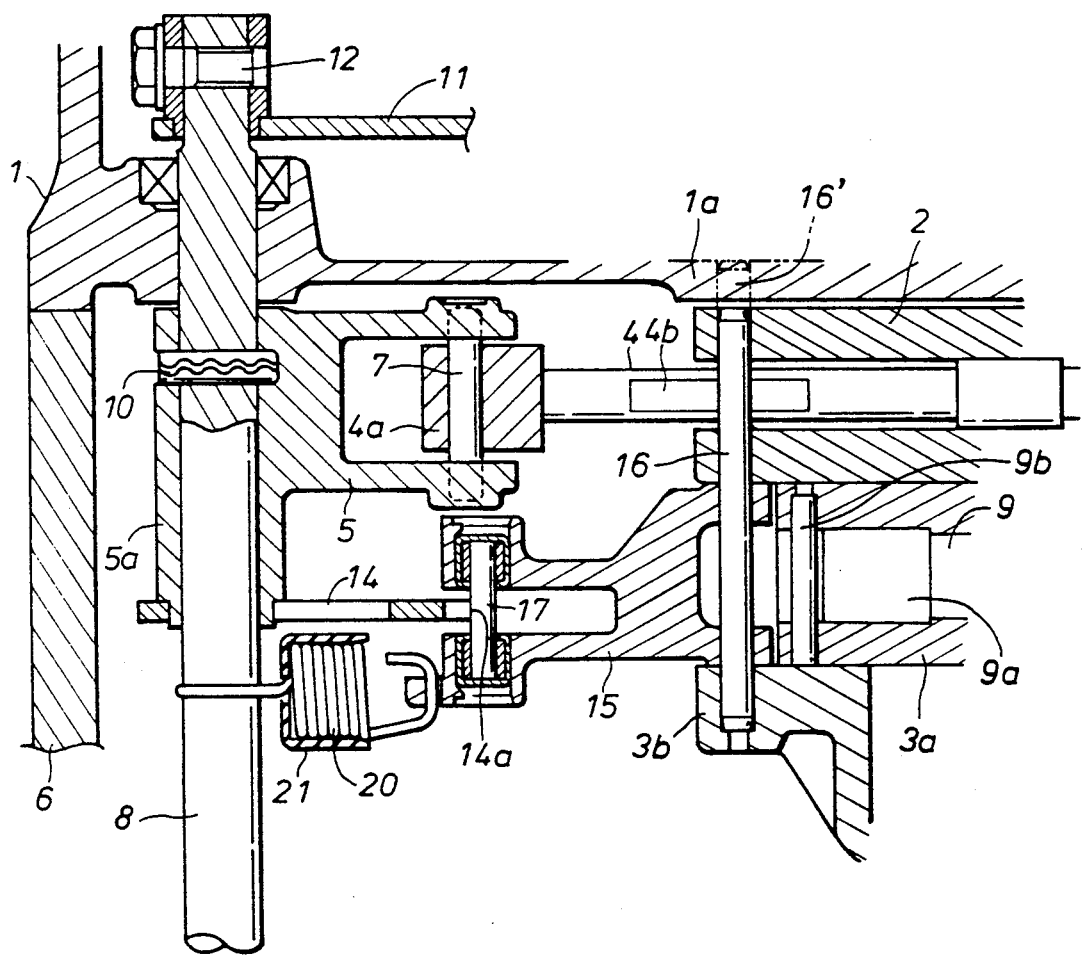
FIG. 2 is a sectional view taken along line II—II of FIG. 1.

Referring to FIGS. 1 and 2, in the illustrated automatic transmission system, a part of a torque converter case 1 accommodating a torque converter not shown in the drawings is formed as an oil path body 1a having various oil passages defined on its outer surface. A main valve body 2 is attached to this oil path body 1a in such a manner that various oil passages may be defined and communicated as required between the oil path body 1a and the main valve body 2. On the outer surface of the main valve body 2 are attached a secondary valve body 3a, and a servo valve body 3b one over the other in that order. The main valve body 2, the secondary valve body 3a and the servo valve body 3b are covered by a transmission case 6.

The main valve body 2 accommodates therein a manual valve element 4 forming a manual valve in cooperation with the main valve body 2 for selecting a shift position by acting upon a hydraulic circuit not shown in the drawings. The secondary valve body 3a likewise defines various valves therein, and the valve element 9 of only one of such valves is shown in FIG. 2. The bore slidably receiving this valve element 9 is closed by a cylindrical plug 9a which is in turn prevented from coming off by a pin 9b passed through the secondary valve body 3a.

Figure 3:
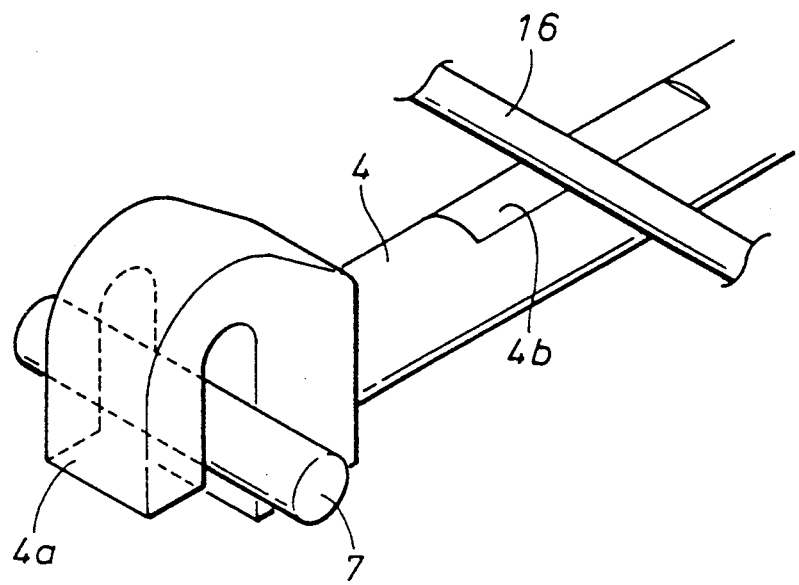
FIG. 3 is a perspective view of an essential part of FIG. 1.

One end of the manual valve element 4 projects from the main valve body 2, and its hooked end portion 4a is engaged with a free end of a transmission arm 5 via a pin 7. (FIG. 3). The base end of the transmission arm 5 is fitted onto a control shaft 8 rotatably passed through the torque converter case 1, and is secured against both axial and radial movements relative to the control shaft by a pin 10. The end of the control shaft 8 on the other side of the wall of the converter case 1 integrally carries a lever 11 via a threaded bolt 12, and the free end of this lever 11 is functionally connected to a shift lever provided in the passenger compartment but not shown in the drawings.

The base end of the transmission arm 5 is formed with a cylindrical extension 5a extending away from the wall of the torque converter case 1, and a base end of a sector-shaped detent cam plate 14 is integrally attached to the cylindrical extension 5a by welding. Therefore, the control shaft 8, the transmission arm 5 and the detent cam plate 14 rotate integrally with each other. The free end of the detent cam plate 14 is provided with a wavy cam surface 14a to which a roller 17 of a detent arm 15 abuts as described hereinafter. A middle part of the detent cam plate 14 is provided with a through hole 14b so as to facilitate the positioning of the detent cam plate 14 when mounting it on the cylindrical extension 5a of the transmission arm 5.

The base end of the detent arm 15 is rotatably supported between the main valve body 2 and the servo valve body 3 via a pin 16 which is fitted into the main valve body 2 at its one end and into the serve valve body 3a at its other end in such a manner that the swing shaft of the detent arm 15 extends in parallel with the control shaft 8. As shown in FIG. 3, this pin 16 also engages with a planar portion 4b of the manual valve element 4 so that the rotation of the manual valve element 4 may be restricted, and the proper communication between the ports and oil passages of the main valve body 2 may be ensured. Optionally, as shown by the imaginary line 16' in FIG. 3, the pin 16 may also be passed into a registration hole provided in the oil path body 1a so that the main valve body 2 may be accurately positioned relative to the oil path body 1a.

Figure 4:
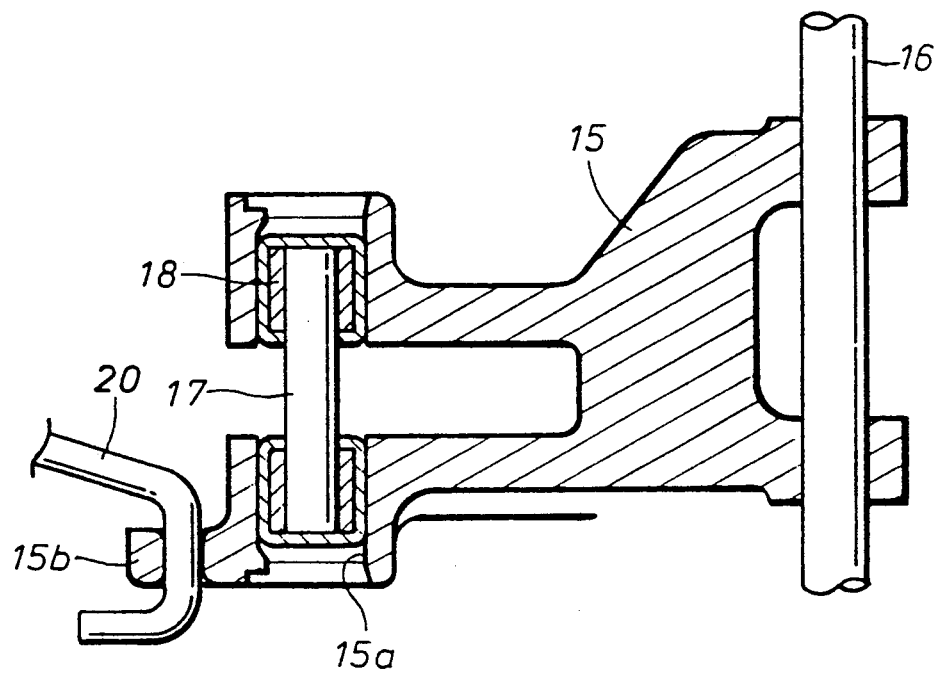
FIG. 4 is an enlarged sectional view of the detent arm.

As illustrated in FIG. 4 in enlarged scale, the free end of the detent arm 15 is bifurcated, and through holes 15a are passed through the bifurcated ends. A roller 17 for engaging with the cam surface 14a of the detent cam plate 14 is rotatably supported in the through holes 15a via bearings 18 so that the force required to rotate the detent cam plate 14 with the shift lever may be reduced. The roller 17 and the bearings 18 are prevented from coming off by crimping each end of the through holes 15a. A hook portion 15b is integrally provided in a suitable location on the free end of the detent arm 15, and an end of a tension coil spring 20 is engaged with this hook portion 15b. The other end of the tension coil spring 20 is engaged with the control shaft 8 itself. Therefore, the detent arm 15 is always urged toward the detent cam plate 14, and the roller 17 is always engaged with the cam surface 14a. The hook portion 15b has its edges rounded so that the associated end portion of the tension coil spring 20 may not be damaged by scraping. The tension coil spring 20 is surrounded by a rubber cover 21 so as to prevent undesirable vibration of the tension coil spring 20.

Now the operation of this embodiment is described in the following.

When the operator of the motor vehicle operates the shift lever, the manual valve element 4 is actuated by way of the lever 11, the control shaft 8 and the transmission arm 5, and the shifting of the gears takes place. The cam surface 14a of the detent cam plate 14 is provided with depressions according to different shift positions such as P (parking), R (reverse), N (neutral) and D (forward drive), and the manual valve element 4 can be held in each of the shift positions with a suitable retaining force which is produced by the roller 17 being urged into each of the depressions provided in the cam surface 14a of the detent cam plate 14 and transmitted thereto via the detent cam plate 14, the control shaft 8 and the transmission arm 5. This retaining force is also transmitted to the shift lever which is operated by the operator of the vehicle.

Thus, according to the present invention, since no extra radial force is applied to the opening provided on the casing of the transmission system for rotatably supporting the control shaft, the force required to operate the shift lever would not be increased from the initially designed level. Further, by using a tension coil spring as the spring means, the freedom of design such as spatial layout is improved. In short, the present invention offers a significant advantage in this technical field.

Although the present invention has been described in terms of a preferred embodiment thereof, it is obvious to a person skilled in the art that various alterations and modifications are possible without departing from the scope of the present invention which is set forth in the appended claims.

What we claim is:

1. A detent structure for a hydraulic automatic transmission system, comprising:

a control shaft rotatably supported by a fixed part of the automatic transmission system;

linkage means for transmitting an operating movement of a shift lever to an angular movement of said control shaft;

a detent cam plate integrally attached to an radially extending from said control shaft, a free end of said detent cam plate being provided with a cam profile defining a plurality of depressions corresponding to different shift positions of said automatic transmission system;

a detent arm rotatably supported by a fixed part of said automatic transmission system and provided with a cam follower for engaging with said cam profile of said detent cam plate; and spring means extending across said control shaft and said detent arm to urge said cam follower towards said cam profile.

2. A detent structure according to claim 1, wherein said spring means consists of a tension coil spring.

3. A detent structure according to claim 1, wherein said detent arm is rotatably supported by a pin passed through a fixed part of said automatic transmission system and a valve body attached thereto.

4. A detent structure according to claim 1, wherein said detent arm is rotatably supported by a pin passed through two valve bodies securely attached to said fixed part of said automatic transmission system.

5. A detent structure according to claim 3, wherein said pin rotatably supporting said detent arm engages with a planar part of an otherwise substantially cylindrical valve element slidably received in said valve body.

* * * * *